US009189809B1

(12) United States Patent
Shieh et al.

(10) Patent No.: US 9,189,809 B1
(45) Date of Patent: Nov. 17, 2015

(54) PURCHASE TRANSACTION PRESENTATION

(71) Applicant: Square, Inc., San Francisco, CA (US)

(72) Inventors: Jesse Shieh, San Francisco, CA (US);
Jesse Reiss, San Francisco, CA (US);
Vida Ha, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 335 days.

(21) Appl. No.: 13/791,565

(22) Filed: Mar. 8, 2013

(51) Int. Cl.
*G06Q 30/00* (2012.01)
*G06Q 30/06* (2012.01)
*G06Q 99/00* (2006.01)

(52) U.S. Cl.
CPC ........ *G06Q 30/0629* (2013.01); *G06Q 30/0641* (2013.01); *G06Q 99/00* (2013.01); *G06Q 30/06* (2013.01); *G06Q 30/0601* (2013.01); *G06Q 30/0643* (2013.01)

(58) Field of Classification Search
CPC .............. G06Q 30/06; G06Q 30/0601; G06Q 30/0643; G06Q 99/00; G06Q 30/0641; G06F 17/30864; G06F 17/3087
USPC ................ 705/26.1, 27.2, 500, 27.1; 707/706
See application file for complete search history.

(56) References Cited

U.S. PATENT DOCUMENTS

| | | | |
|---|---|---|---|
| 6,408,292 B1* | 6/2002 | Bakalash et al. | |
| 7,249,708 B2* | 7/2007 | McConnell et al. | 235/383 |
| 7,792,709 B1* | 9/2010 | Trandal et al. | 705/26.1 |
| 8,024,267 B2* | 9/2011 | Olliphant et al. | 705/39 |
| 9,031,866 B1* | 5/2015 | Ng et al. | 705/26.1 |
| 2002/0147656 A1* | 10/2002 | Tam et al. | 705/26 |
| 2006/0175403 A1* | 8/2006 | Fossen McConnell et al. | 235/385 |
| 2007/0150354 A1* | 6/2007 | Walker et al. | 705/14 |
| 2007/0290039 A1* | 12/2007 | Pfleging et al. | 235/384 |
| 2008/0162296 A1* | 7/2008 | Hanif et al. | 705/26 |
| 2009/0076949 A1* | 3/2009 | Olliphant et al. | 705/39 |
| 2010/0161400 A1* | 6/2010 | Snodgrass et al. | 705/14.16 |
| 2012/0203632 A1* | 8/2012 | Blum et al. | 705/14.53 |
| 2012/0316989 A1* | 12/2012 | Wong et al. | 705/26.9 |
| 2013/0282488 A1* | 10/2013 | Blum et al. | 705/14.53 |

OTHER PUBLICATIONS

Anon., "ARC; ARC Releases AeroTrend to Support Financial Industry," Journal of Transportation, Sep. 10, 2011.*
*Online Shopping.* Wikipedia. Last modified on Nov. 2, 2014. Retrieved on Nov. 10, 2014. Retrieved from the internet: URL<http://en.wikipedia.org/wiki/Online_shopping>. 12 pages.
*Ticker Tape.* Wikipedia. Last modified on Oct. 30, 2014. Retrieved on Nov. 10, 2014. Retrieved from the internet: URL<http://en.wikipedia.org/wiki/Ticker_Tape/>. 4 pages.

* cited by examiner

*Primary Examiner* — Nicholas D Rosen
(74) *Attorney, Agent, or Firm* — Lee & Hayes, PLLC

(57) ABSTRACT

Methods, systems, and apparatus, including computer programs encoded on computer storage media, for presenting information about purchase transactions. One of the methods includes receiving a request for information about a merchant and identifying one or more purchase transactions conducted by the merchant in response to the request. A presentation is generated comprising a purchase transaction entry for each of the one or more purchase transactions, wherein each purchase transaction entry represents one of the one or more purchase transactions conducted by the merchant and identifies one or more items sold in the purchase transaction. The presentation is provided in response to the request.

18 Claims, 4 Drawing Sheets

PURCHASE TRANSACTION PRESENTATION

TECHNICAL FIELD

This disclosure relates to presenting information about purchase transactions conducted by merchants.

BACKGROUND

When searching for merchants, a user can enter a search query into a search engine. The search query can include a merchant's name or a name of a desired product or service. The user can limit the search by location. The search engine can return results to the user in response to the search query and any limitations provided by the user. To perform a transaction (e.g., a purchase) with a merchant in the search results, the user must visit the merchant's retail store or the merchant's online shopping portal.

In a conventional point-of-sale electronic credit card transaction, the transaction is authorized and captured. In the authorization stage, a physical credit card with a magnetic stripe is swiped through a merchant's magnetic card reader, e.g., as part of a point-of-sale device. A payment request is sent electronically from the magnetic card reader to a credit card processor. The credit card processor routes the payment request to a card network, e.g., Visa or Mastercard, which in turn routes the payment request to the card issuer, e.g., a bank. Assuming the card issuer approves the transaction, the approval is then routed back to the merchant. In the capture stage, the approved transaction is again routed from the merchant to the credit card processor, card network and card issuer, and the payment request can include the cardholder's signature (if appropriate). The capture state can trigger the financial transaction between the card issuer and the merchant, and optionally creates a receipt. There can also be other entities, e.g., the card acquirer, in the route of the transaction. Debit card transactions have a different routing, but also require swiping of the card.

Many transactions require that the customer sign a physical receipt, electronically approve a transaction, e.g., by pressing an approve button on a user interface, electronically sign for the transaction, e.g., with a stylus or finger on an electronic signature capture device with a touch sensitive pad, or enter an authorizing personal identification number (PIN).

SUMMARY

This specification relates to how a system can provide a presentation of purchase transactions conducted by a merchant. The system can provide information that identifies items sold in purchase transactions. The system can provide such information to users as suggestions, to give users a sense of items that are popular, to give users a sense of items that are commonly bought together from a particular merchant, or to give users a sense of the popularity or level of activity of a particular merchant.

In general, one innovative aspect of the subject matter described in this specification can be embodied in methods that include the actions of receiving a request for information about a merchant; identifying one or more purchase transactions conducted by the merchant; generating a presentation comprising a purchase transaction entry for each of the one or more purchase transactions, wherein each purchase transaction entry represents one of the one or more purchase transactions conducted by the merchant and identifies one or more items sold in the purchase transaction; and providing the presentation in response to the request. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Each purchase transaction entry includes a name of each item or a picture of each item sold in the purchase transaction. Each purchase transaction entry includes a timestamp indicating when the purchase transaction was conducted. The actions include ordering purchase transactions in the presentation by timestamp time. Receiving a request for information about a merchant comprises obtaining a location of a user device; and identifying a merchant within a threshold distance to the location. Identifying one or more purchase transactions conducted by the merchant comprises identifying one or more recently-performed purchase transactions. The presentation is a merchant specific directory page of a merchant directory. The actions include receiving an indication of a user selection of a purchase transaction entry; in response to receiving the indication, initiating a new purchase transaction with the merchant for items identified in the selected purchase transaction entry.

Advantages may include one or more of the following. Providing a presentation of items bought in a purchase transaction can facilitate more sales for a merchant by giving users suggestions for what items to purchase. Providing information about items purchased also facilitates sales by providing users with information about products that are popular and products that are routinely bought together. The presentation can also allow users to initiate the same purchase transaction, making it easier for the user to choose items and initiate transactions, further driving sales. An active presentation can be more visually appealing and engaging with users.

BRIEF DESCRIPTION OF THE DRAWINGS

Like reference numbers and designations in the various drawings indicate like elements.

DETAILED DESCRIPTION

Figure 1:
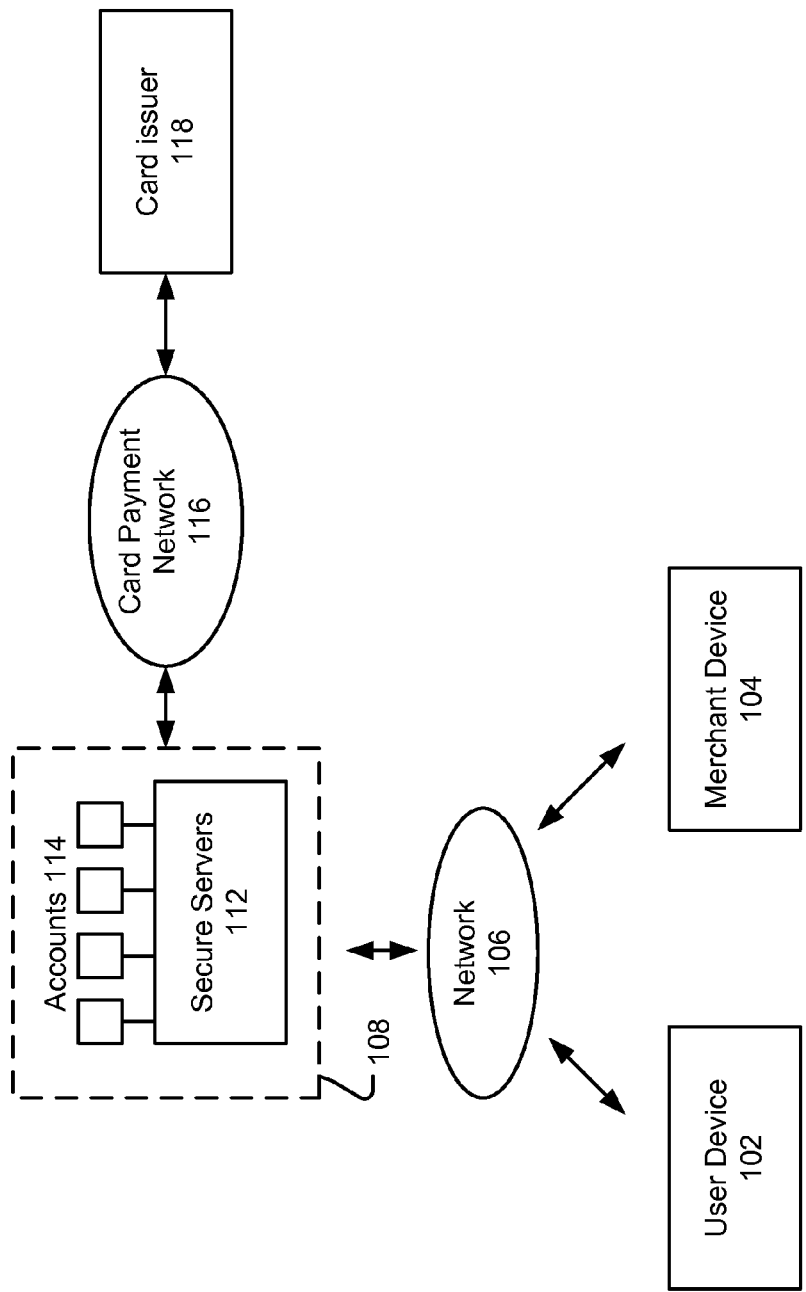
FIG. 1 is a schematic illustration of an example cardless payment system architecture.

As an overview, the system provides information about items purchased in purchase transactions conducted by a merchant. For example, the system can provide information about items purchased in purchase transactions that were conducted by a merchant during the last few minutes, the last hour, or the last week. A user can then view a presentation of information about these purchase transactions in a web browser or in a smartphone application, for example, to get a sense for what items are popular and/or what items people routinely buy together.

Information about items sold in purchase transactions by a merchant can be provided by a payment service system that processes payment transactions on behalf of merchants. The examples below will relate to payment service systems generally, although other systems that do not process payment transactions can also generate and provide such data. Other systems can obtain such data from a payment service system or from other sources, e.g. from their own records of purchase transactions. A payment service system can give merchants who use the service as well as users conducting the purchase transactions the opportunity to opt-in or opt-out of having their purchase transactions presented in this way.

A payment service system allows a user (also called a customer or payer) to purchase items from a merchant while physically present at the merchant, e.g., at the point of sale, or online, e.g. through a merchant's website. Some payment service systems process cardless payment transactions. A cardless payment transaction is one where a user conducts the transaction with a merchant at a point of sale or online by using a financial account without physically presenting or otherwise providing information about a payment card to the merchant at the point of sale. In fact, the merchant need not receive any details about the financial account, e.g., the credit card issuer, credit card number, and the like is not provided to the merchant.

From the user's perspective, the user first signs up for an account with the payment service system. The sign-up process requires certain information, such as information about a financial account sufficient to perform a transaction with the account. For example, if the financial account is a credit card account, then credit card information can be provided, e.g., credit card number and expiration date. The user can also sign up with other payment methods such as debit cards, pre-paid cards, bank accounts, or other third party financial accounts. The sign up process can also require contact information for the user, e.g., mailing address and email, and other personal identifying information, e.g., a photograph of the user. After creating an account, the user can select a merchant that also has an account with the payment service system.

To conduct cardless payment transactions with a merchant at the point of sale, the user can give consent to perform a cardless payment transaction with the merchant. After the user gives consent, the merchant can, without a presentment of the physical payment card, charge (in the case of credit cards) or debit (in the case of debit cards) the user's financial account for items the user wants to buy. Because the user's payment card is already on file with the cardless payment system, the user does not need to physically present a credit card to the merchant.

FIG. 1 is a schematic illustration of the architecture of an example payment system 100. The overall system 100 includes a user device 102, a merchant device 104, and a payment service system 108 connected to a network, e.g., the Internet 106. The user device 102 is a computing device capable of running software applications. For example, the user device 102 can be a desktop computer, laptop computer, smartphone, or tablet computer. The merchant device 104 is also a computing device, capable of processing transactions. The merchant device 104 can be a mobile device, a server, a desktop computer, a laptop computer, a dedicated point of sale system, or other data processing apparatus. By using the payment service system 108, the user device 102 and merchant device 104 can conduct a payment transaction, for example a cardless or online payment transaction.

The user and merchant devices can communicate with the payment service system 108 using the network 106. The payment service system 108 includes one or more servers 112, at least some of which can handle secure transactions (e.g., a secure server), to processes all transactions between the user device 102 and merchant device 104. In general, servers 112 can store public merchant information such as the merchant's address or phone number. The servers 112 can also be responsible for transferring or updating the user application to the user's mobile device or transferring or updating the merchant application to the merchant's computing device. In particular, the servers 112 can be responsible for sending information about merchants that have accounts with the cardless payment system to the user device 102. The servers 112 also handle secure information such as credit card numbers, debit card numbers, bank accounts, user accounts, user identifying information or other sensitive information.

The payment service system 108 can communicate electronically with a card payment network 116, e.g., Visa, Mastercard, or the like. The payment service system 108 can communicate with a computer system 116 of a card payment network, e.g., Visa or MasterCard. The payment service system 108 can communicate with a computer system 116 over the same network 106 used to communicate with the user device 102, or over a different network. The computer system 116 of the card payment network can communicate in turn with a computer system 118 of a card issuer, e.g., a bank. There can also be computer systems of other entities, e.g., the card acquirer, between the payment service system 108 and the card issuer.

Before a transaction between the user and the merchant can be performed, the user must create a user account with the payment service system 108 and the merchant must create a merchant account with the payment service system 108.

The user can sign up using a mobile application or using an online website, and can use the mobile device 102 or another computing device, e.g., a home computer. At some point prior to the transaction, a user application is downloaded to the user device 102, e.g., through an application store. Creation of the user account can be handled through the user application, or through another application, e.g., a generic web browser. The user enters a name, account password, and contact information, e.g., email address. Before a transaction can be performed, the user also enters financial account information sufficient to conduct the transaction into the payment service system 108. For example, in the case of a credit card account, the user can enter the credit card issuer, credit card number and expiration date into the payment service system 108; the card validation value and mailing address may also be required. However, the financial account could also be associated with a debit card or pre-paid card, or another third party financial account.

In some implementations, the payment service system 108 requires additional personal identifying information before a transaction can be performed. For example, the payment service system 108 may require a photo of the user before a transaction can be performed. The photo of the user can be provided to the merchant at the point of sale so that the merchant can compare the photo to the person. In addition, the payment service system 108 can require a personal identification number (PIN) to be entered by the user. Other requirements can also be added to increase security. The data associated with a user account 114 can be stored at the servers 112, e.g., in a database.

If the user is signing up with a mobile application, the user's financial account information can be entered by swiping the financial transaction card through a slot of a card reader coupled to the mobile device. Alternatively, the user can enter in financial account information by typing in information at the mobile device 102, selecting a card from an application on the mobile device, from an online entity, or others. In some implementations, another external application generates a receipt that is sent to the user. The receipt then includes a hypertext link that allows a user to easily create a user account in the cardless payment system. For example, activating the link in the receipt can automatically create a user account with a payment card prefilled with the card used in the receipt to reduce effort by the user. In effect, activating a new account using a receipt auto-verifies the user into the cardless payment system.

The merchant can sign up for an account using the merchant device 104 or another device. The merchant enters a name, account password, and contact information, e.g., email address, and physical location information, e.g., an address, into the payment service system 108. The merchant can also provide other information, e.g., a list of goods or services available, operating hours, phone number, a small identifying image logo or mark, to the payment service system 108. The data associated with the merchant account 114 can be stored at the servers 112, e.g., in a database.

At some point prior to the transaction, a merchant application is downloaded to the merchant device 102, e.g., through an application store. Creation of the merchant account can be handled through the merchant application, or through another application, e.g., a generic web browser.

Eventually, in order to receive funds from the transaction, the merchant will need to enter financial account information into the payment service system sufficient to receive funds. For example, in the case of a bank account, the user can enter the bank account number and routing number. However, the merchant's financial account can also be associated with a credit card account or another third party financial account. In addition, in some implementations, if the merchant has not entered the financial account information, the cardless payment processor can hold the received funds until the financial account information is provided.

The payment service system can help merchants facilitate sales of their products by providing information about items sold in purchase transactions conducted by the merchant. The system can for example provide a merchant directory that includes information about merchants who use the payment service system to conduct payment transactions. In some implementations, the merchant directory includes an individual merchant page for each merchant. The merchant page can be in any appropriate presentation format, for example, a HTML page renderable by a web browser or information presented by a mobile application running on a mobile user device.

The payment service system can generate merchant pages that list items sold in purchase transactions conducted by the merchant, either at the point of sale or online. Such information can facilitate future sales by providing other users with suggestions of items that they may want to purchase and by giving other users indications of popular items and items that are commonly purchased together.

Figure 2:
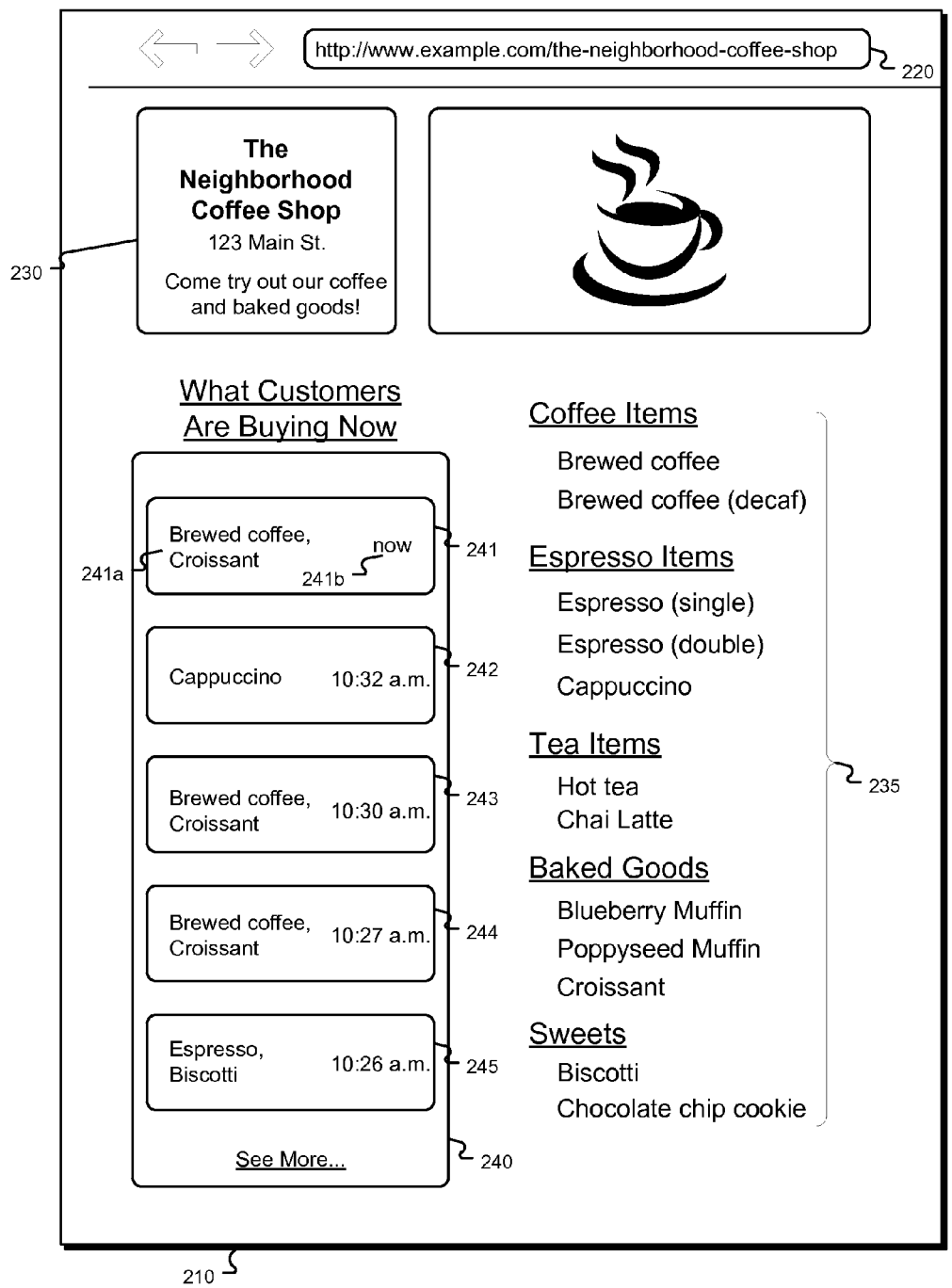
FIG. 2 is a diagram of an example presentation of purchase transactions conducted by a merchant.

FIG. 2 is a diagram of an example presentation of purchase transactions conducted by a merchant. A payment service system can maintain a directory of merchants that accept cardless payment transactions. Users can search for merchants on a search interface page, e.g., by proximity and/or type of good or service provided. The search interface page can provide links to individual merchant-specific pages. The payment service system can provide information about a particular merchant on a merchant-specific page. For example, the system can maintain a web page accessible over the Internet for each merchant.

FIG. 2 illustrates a user interface 210 of a web browser that has navigated to a merchant-specific page of a merchant directory. The address bar 220 of the browser includes a URL that corresponds to a directory page of a merchant maintained by the system. The directory page includes general merchant information 230 as well as a list of menu items 235 sold by the merchant.

In addition, the directory page includes an area 240 for displaying purchase transaction entries 241-245 corresponding to purchase transactions conducted by the merchant. Example purchase transaction entry 241 includes the items sold 241a in a single purchase transaction by a single user. The purchase transaction entry 241 can also include a timestamp 241b indicating when the purchase transaction occurred. The timestamp 241b can be presented as either a time of day, e.g. the local time of day, or as an indication of how long ago the purchase transaction occurred, e.g. five minutes, one day, or one week ago. The transaction entries 241-245 can be arranged in chronological order.

Purchase transaction entries displayed on the directory page can include additional or less information. For example, a purchase transaction entry can include a picture of the item sold, a price of each item sold, a total price of the purchase transaction, a description of items sold during the purchase transaction, in addition to other types of information.

The system can automatically update area 240 at certain times to give an up-to-date view of items that are being purchased. For example, the system can update the area 240 every minute, every five minutes, or after each purchase transaction is conducted.

Although the presentation in FIG. 2 relates to only one merchant, the payment service system can also generate other presentations that include information about purchase transaction entries of multiple merchants selected based on a variety of factors, which can include, for example, merchant categories, locations, and user search queries.

Figure 3:
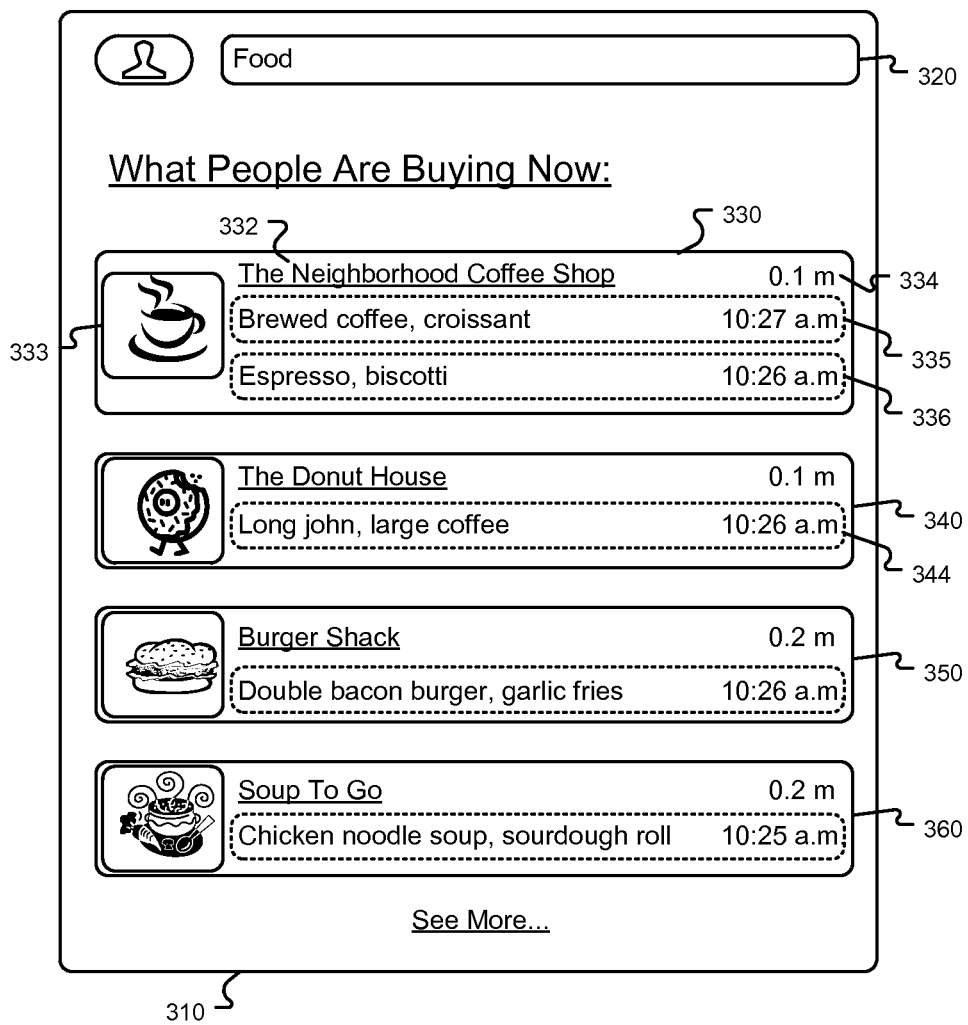
FIG. 3 is a diagram of an example presentation of purchase transactions conducted by multiple merchants.

FIG. 3 is a diagram of an example presentation of purchase transactions conducted by multiple merchants. A payment service system can provide an application that can be installed and executed on a mobile device for displaying information about purchase transactions conducted by merchants. Rather than the purchase transaction entries being displayed on a merchant-specific directory page, in this example, the purchase transaction entries are displayed with merchant search results for merchants that the system has determined to be responsive to a search query, a category, or a location. The example presentation in FIG. 3 could also be provided as part of a merchant directory maintained by the payment service system, for example, as part of the initial page of the merchant directory.

FIG. 3 illustrates a user interface 310 of a mobile application, which includes a search box 420 that allows a user to search for merchants. The user can for example use the search box 320 to specify a search query, a category, or a location.

In this example, a user has entered the search query "Food" into the search box 320 of the user interface 310. For example, the application can send the search query to a payment service system and be provided with merchants that are relevant to the search query. The payment service system can receive the query and identify merchants that match the user search query, which can include, for example, locating merchants that are near a user's location. The user can search for merchants in other ways, for example, by specifying a merchant category or a particular location, e.g. an address or geographic coordinates.

In response to the search query, the payment service system can then provide information to the mobile device about the identified merchants by providing a number of merchant entries 330, 340, 350, and 360.

The merchant entries can be organized into rows, each row containing the name of a single merchant and purchase transaction entries conducted by the merchant. For example, merchant entry 330 includes a merchant name 323, a merchant icon 333, and two purchase transaction entries 335 and 336. Merchant entry 340 includes only one purchase transaction 344. As in the example described with reference to FIG. 2, each purchase transaction entry can include the items purchased and the time that the items were purchased. The purchase transaction entries can be arranged in chronological order or in an order indicating increasing distance from a current location of the user.

Each merchant entry can also include a distance that a merchant is located from a current location of the user's mobile device. For example, merchant entry 334 includes a distance of 0.1 miles from the user's current location to the merchant named "The Neighborhood Coffee Shop." The distance 334 can be located in the row with the name 332 of the merchant, e.g., on the right side of the name 332 of the merchant.

Figure 4:
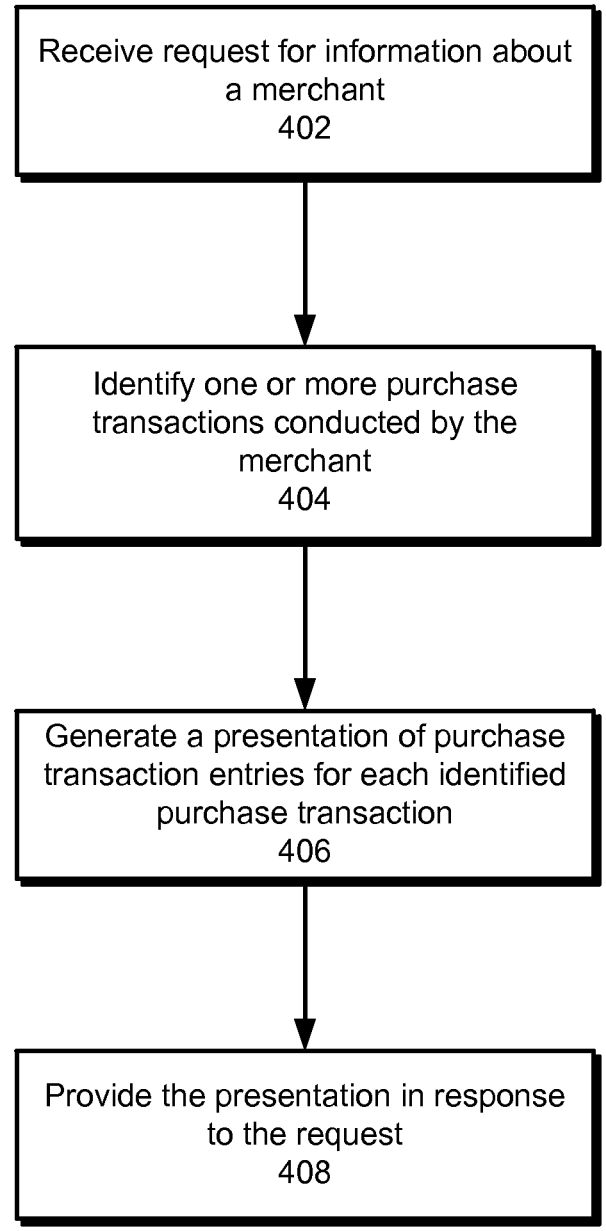
FIG. 4 is a flow chart of an example process for presenting purchase transaction entries.

Each merchant can be represented with a custom-designed "card". In some implementations, selecting the row containing the name 332 of the merchant, or selecting the name 332 of the merchant, will cause the user's mobile device to display more information regarding the respective merchant. In some implementations, the additional merchant information is represented by a custom-designed merchant page. For example, the mobile device can display a map around the merchant's area, the merchant's phone number, the merchant's operating hours, or other merchant information, FIG. 4 is a flow chart of an example process 400 for presenting purchase transaction entries. In general, a payment service system obtains information pertaining to purchase transactions conducted by a merchant and generates a presentation of purchase transaction entries corresponding to the purchase transactions. For convenience, the process 300 will be described as being performed by a system of one or more computers, e.g. the payment service system 108 of FIG. 1.

The system receives a request for information about a merchant (402). As described above, the system can maintain a directory of merchants and can receive the request for information about the merchant by virtue of a user requesting a URL of a particular merchant page in the merchant directory.

The system can also receive requests for information about a merchant in the form of a search query, a requested category, or a location, or some combination of these. For example, the system can receive a search query, a category, or a location requesting a search of the merchant directory and can identify a merchant in response to the request. For example, if the search query is "coffee," the system can identify merchants that sell coffee. If the user specifies a category "Coffee Shops," the system can identify merchants that sell coffee shops. If the user specifies a location, e.g. 123 Main St., the system can identify merchants that are near the specified location.

The URL requests, search queries, categories, and locations can be received from a web browser or an application running, for example, on a desktop computer or on a mobile device.

The system identifies one or more purchase transactions conducted by the merchant (404). In general, the system receives information describing purchase transactions conducted by the merchant and selects a one or more purchase transactions for display.

The system can determine which of the purchase transactions to present based on a variety of criteria. For example, the system can select a subset of the most-recently performed purchase transactions for display, e.g. the five, ten, or twenty, most-recently performed purchase transactions. The system can also select purchase transactions that were performed in a recent time period, e.g. within the last five minutes, the last day, or the last week.

The system can also select a subset of purchase transactions for presentation based on a price range. For example, the system can determine to only show purchase transactions in which in the purchase amount was in a specified range, e.g. between five and fifty dollars.

The system can also select a subset of purchase transactions for presentation based on popularity. The system can maintain historical statistics about items that are commonly purchased together for a particular merchant. The system can then select a purchase transaction for presentation if the popularity of the purchase transaction satisfies a threshold. For example, people may routinely purchase "brewed coffee" and a "croissant" from a particular merchant. The system can determine that this combination of items satisfies a popularity threshold, e.g. at least five occurrences in the past week. The system can then determine that this purchase transaction should be selected for presentation.

The system generates a presentation comprising a purchase transaction entry for each of the one or more purchase transactions (406). Each purchase transaction entry represents a purchase transaction conducted by the merchant and identifies one or more products sold in the purchase transaction. For example, the purchase transaction entry can identify the product sold by name, by a picture, or both. The system can also present with the purchase transaction a timestamp that indicates when the purchase transaction occurred. The system can also include in each purchase transaction entry a price of each item sold, a total amount of the purchase transaction, or both. To maintain privacy of the merchant's customers, the system can generate purchase transaction entries that do not identify customers who purchased the items.

The presentation or purchase transaction entries can take a variety of forms. For example, the purchase transaction entries can be presented on a merchant-specific directory page. The purchase transactions can be presented alongside other information about the merchant, for example, the merchants address and a listing of items available for purchase. The presentation of purchase transaction entries can also be in the form of merchant search results corresponding to merchants that the system has identified as being responsive to a search query, a category, or a location.

In some implementations, the system orders the purchase transaction entries by timestamp. The system can also automatically update the presentation as more purchase transactions occur, thus giving the user a live feed of purchase transactions conducted by the merchant. When the presentation includes purchase transaction entries with merchant search results, the system can automatically update purchase transactions within each merchant entry of the merchant search results.

The system provides the presentation in response to the request (408). For example, the system can provide the presentation in the form of a web page served over the Internet to a web browser. The system can also provide the presentation in an application running on a mobile device.

In some implementations, the system may provide the functionality for purchase transaction entries in the presentation to be selectable in order to allow the user to initiate a request to conduct the same purchase transaction with the merchant.

For example, upon user selection of a purchase transaction entry, e.g. purchase transaction entry 243 of FIG. 2, the system can initiate a request to the merchant to perform the same purchase transaction on behalf of the user. The system can ask the user for confirmation that the transaction should be performed.

The system can then obtain the user's account information and communicate with a card payment network to request authorization for the transaction. If the payment is not authorized, the payment service system can notify the user that the transaction has failed.

If the payment was authorized, the payment service system can notify the merchant that the user has been authorized to conduct a payment transaction with items as specified in the selected purchase transaction entry. For example, the payment service system can send a merchant device an indication of the items in the purchase transaction and information about the identity of the user. The system can then send the user an indication, e.g. an on-screen notification or a text message, indicating that the payment transaction was successful. The items in the selected purchase transaction can then either be prepared by the merchant for pick-up at the point of sale or processed for shipping from an online shopping cart.

In some implementations, the system may require that the user be located within a specified distance to the merchant's location in order to initiate a purchase transaction with the merchant by selecting a purchase transaction entry. For example, if the user is viewing a purchase transaction entry on a mobile device, the system can obtain a location of the mobile device and determine whether the device is within a minimum distance, e.g. 100 meters, before initiating the purchase transaction. If the user is not within the minimum distance, the system can notify the user through the application on the mobile device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a non-transitory computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:
1. A computer implemented method comprising:
receiving, at one or more computer servers of a payment service system, a request for information about a merchant from at least one user device, wherein the one or more computer servers process purchase transactions conducted by the merchant on at least one merchant device and store the purchase transactions in at least one database;
in response to receiving the request, retrieving information about the merchant from the at least one database, the information comprising one or more purchase transactions conducted by the merchant;
selecting, in the retrieved information, a subset of one or more purchase transactions conducted by the merchant, wherein selecting the subset is based at least on one or more of: most recently conducted purchase transactions, purchase transactions conducted in a specified period, price range of purchase transactions, or popularity of purchase transactions;
generating presentation information representing a purchase transaction entry for each of the one or more purchase transactions of the selected subset of purchase transactions, wherein each purchase transaction entry represents one of the one or more purchase transactions conducted by the merchant and identifies one or more items sold in the purchase transaction;
transmitting the presentation information over a wireless network comprising the Internet to the at least one user device in response to the request, wherein the presentation information causes the at least one user device to display a presentation based, at least in part, on the presentation information;
automatically updating, by the one or more computer servers of the payment service system, the presentation information; and transmitting, over the wireless network, the updated presentation information to the at least one user device to cause the at least one user device to display a live feed of purchase transactions conducted by the merchant.

2. The method of claim 1, wherein each purchase transaction entry includes a name of each item or a picture of each item sold in the purchase transaction.

3. The method of claim 1, wherein each purchase transaction entry includes a timestamp indicating when the purchase transaction was conducted.

4. The method of claim 3, comprising ordering purchase transactions in the presentation by timestamp time.

5. The method of claim 1, wherein receiving a request for information about a merchant comprises:
  obtaining a location of the at least one user device; and
  identifying a merchant within a threshold distance to the location.

6. The method of claim 1, wherein the presentation is a merchant-specific directory page of a merchant directory.

7. The method of claim 1, comprising:
  receiving an indication of a user selection of a purchase transaction entry;
  in response to receiving the indication, initiating a new purchase transaction with the merchant for items identified in the selected purchase transaction entry.

8. A payment service system comprising:
  one or more computers and one or more storage devices storing instructions that are operable, when executed by the one or more computers, to cause the one or more computers to perform operations comprising:
    receiving, at the payment service system, a request for information about a merchant from at least one user device, wherein the payment service system processes purchase transactions conducted by the merchant on at least one merchant device and stores the purchase transactions in at least one database;
    in response to receiving the request, retrieving information about the merchant from the at least one database, the information comprising one or more purchase transactions conducted by the merchant;
    selecting, in the retrieved information, a subset of one or more purchase transactions conducted by the merchant;
    generating presentation information representing a purchase transaction entry for each of the one or more purchase transactions of the selected subset of purchase transactions, wherein each purchase transaction entry represents one of the one or more purchase transactions conducted by the merchant and identifies one or more items sold in the purchase transaction;
    transmitting the presentation information over a wireless network comprising the Internet to the at least one user device in response to the request, wherein the presentation information causes the at least one user device to display a presentation based, at least in part, on the presentation information;
    automatically updating, by the payment service system, the presentation information; and
    transmitting, over the wireless network, the updated presentation information to the at least one user device to cause the at least one user device to display a live feed of purchase transactions conducted by the merchant.

9. The system of claim 8, wherein each purchase transaction entry includes a name of each item or a picture of each item sold in the purchase transaction.

10. The system of claim 8, wherein each purchase transaction entry includes a timestamp indicating when the purchase transaction was conducted.

11. The system of claim 10, wherein the operations comprise ordering purchase transactions in the presentation by timestamp time.

12. The system of claim 8, wherein receiving a request for information about a merchant comprises:
  obtaining a location of the at least one user device; and
  identifying a merchant within a threshold distance to the location.

13. The system of claim 8, wherein the presentation is a merchant-specific directory page of a merchant directory.

14. The system of claim 8, wherein the operations comprise:
  receiving an indication of a user selection of a purchase transaction entry;
  in response to receiving the indication, initiating a new purchase transaction with the merchant for items identified in the selected purchase transaction entry.

15. A computer program product, encoded on one or more non-transitory computer storage media, comprising instructions that when executed by one or more computers cause the one or more computers to perform operations comprising:
  receiving, at one or more computer servers of a payment service system, a request for information about a merchant from at least one user device, wherein the one or more computer servers process purchase transactions conducted by the merchant on at least one merchant device and store the purchase transactions in at least one database;
  in response to receiving the request, retrieving information about the merchant from the at least one database;
  identifying, in the retrieved information, one or more purchase transactions conducted by the merchant;
  generating presentation information representing a purchase transaction entry for each of the one or more purchase transactions, wherein each purchase transaction entry represents one of the one or more purchase transactions conducted by the merchant and identifies one or more items sold in the purchase transaction;
  transmitting the presentation information over a wireless network comprising the Internet to the at least one user device in response to the request, wherein the presentation information causes the at least one user device to display a presentation based, at least in part, on the presentation information;
  automatically updating, by the one or more computer servers of the payment service system, the presentation information; and
  transmitting, over the wireless network, the updated presentation information to the at least one user device to cause the at least one user device to display a live feed of purchase transactions conducted by the merchant.

16. The computer program product of claim 15, wherein each purchase transaction entry includes a name of each item or a picture of each item sold in the purchase transaction.

17. The computer program product of claim 15, wherein each purchase transaction entry includes a timestamp indicating when the purchase transaction was conducted.

18. The computer program product of claim 17, wherein the operations comprise ordering purchase transactions in the presentation by timestamp time.

* * * * *